UNITED STATES PATENT OFFICE.

ANDREW RANKIN, OF NEW YORK, N. Y.

IMPROVED DEODORIZING COMPOSITION.

Specification forming part of Letters Patent No. 51,216, dated November 28, 1865.

*To all whom it may concern:*

Be it known that I, ANDREW RANKIN, of the city, county and State of New York, have invented a new and Improved Deodorizing Compound; and I do hereby declare that the following is a full, clear, and exact description thereof, which will enable those skilled in the art to make and use the same.

The present invention relates to a new and useful compound or composition to be used as a deodorizer, to relieve the obnoxious and disagreeable effluvia and odors arising from urinals, water-closets, and other places, the compound being of such nature that while no smell or odor of any consequence is emitted by it, and, if any, so slight as hardly to be perceptible, it will entirely neutralize all the obnoxious effluvia, and not, as in all compounds, substances, or materials heretofore used for such purposes, simply overcome one odor with another of a stronger but somewhat pleasanter nature, yet, nevertheless, not agreeable or desirable.

This compound is composed of the following ingredients, mixed together, in about the proportions stated, viz: Three pounds copperas, three pounds brown or other sugar, molasses, sirups, or other similar article of a sweet nature or possessing saccharine qualities, (but brown sugar I deem to be the most desirable because as is well known it possesses the desired properties in a much greater proportion than any of the other sugars, or even molasses, and also is considerably cheaper,) three ounces saltpeter, one pint solution of chloride of soda, six quarts water.

The copperas, brown sugar, and saltpeter, in the proportions named, or thereabout, are all placed in the water and soda, by which they soon become dissolved, when the compound is ready to be used for the desired purpose, or it can be used before being fully dissolved, the compound, when used, being placed in the best position for the odors emitted from water-closets, urinals, &c., to be entirely neutralized by it, and not simply overcome, as heretofore, the above being the result, as practice and use have fully demonstrated.

When the urine is allowed to mix with the deodorizing compound, the solution of chloride of soda may be dispensed with and to advantage.

I do not intend to limit myself to the particular proportions herein named, as they can be varied, and yet produce the results desired, but those stated have been found to successfully accomplish the object of their use.

I claim as new and desire to secure by Letters Patent—

The compound consisting of the ingredients herein specified, and either with or without the use of chloride of soda, and mixed in about the proportions named, substantially as and for the purpose described.

The above specification of my invention signed by me this 24th day of October, 1865.

ANDREW RANKIN.

Witnesses:
ALBERT W. BROWN,
THEO. TUSCH.